J. Lindly,
Making Wooden Screws.
№ 797.　　　　　　　　　Patented June 20, 1838.
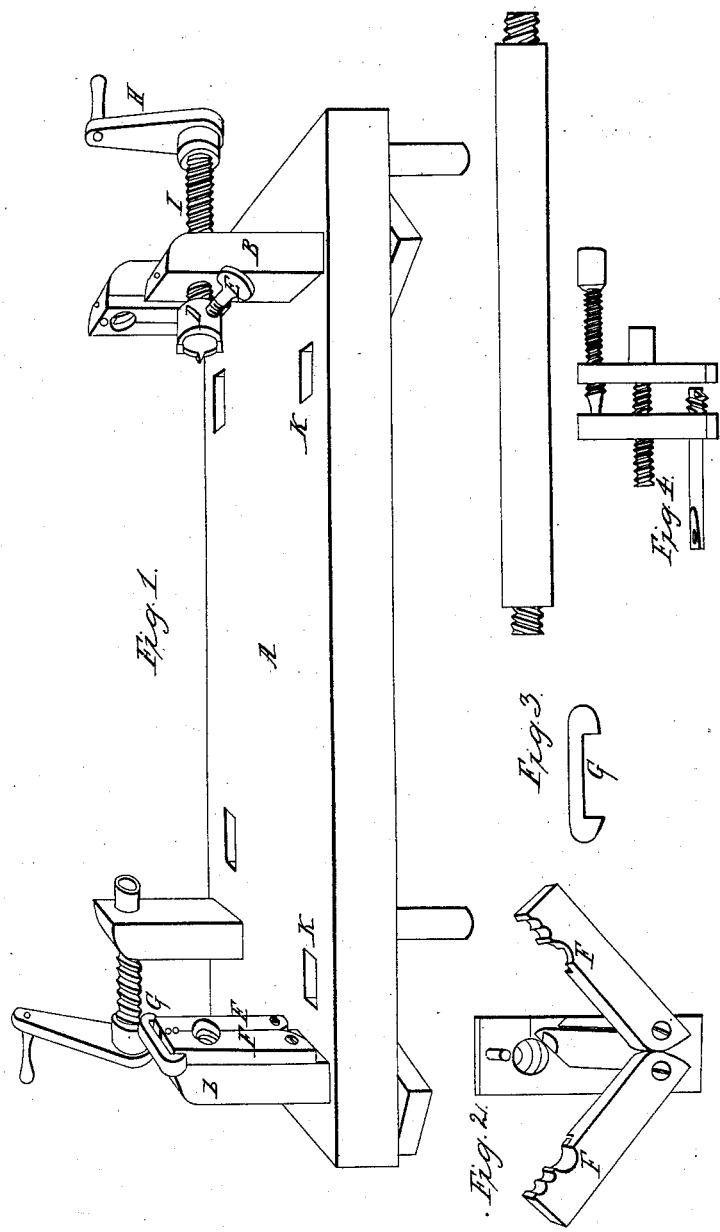

UNITED STATES PATENT OFFICE.

JACOB LINDLY, OF CYNTHIANA, KENTUCKY.

MACHINE FOR CUTTING SCREWS ON THE ENDS OF BEDSTEAD-RAILS.

Specification of Letters Patent No. 797, dated June 20, 1838.

*To all whom it may concern:*

Be it known that I, JACOB LINDLY, of Cynthiana, Harrison county, State of Kentucky, have invented a new and useful Improvement in Machines for Cutting Screws on the Ends of Rails for Bedsteads and in the Sides of the Posts for the Purpose of Securing Them Together, which is described as follows, reference being had to the annexed drawings of the same, making part of this specification.

A represents the bench on which the several parts of the machine are sustained. B b standards rising perpendicularly from the bench—one of them B containing a nut into which is inserted a screw turned by a crank; to the end of which is fastened by a socket and screw D E, one end of the rail—the other end on which the screw is to be cut passing into a nut in the opposite standard; which last mentioned standard b contains the cutting tool made in the shape of the letter V which is therefore called the V for cutting the thread; and two jaws F F placed in front of the V turning on pins or screws inserted through their lower ends into the face of the standard and held together at top by means of a clamp G. These jaws are for the purpose of embracing and holding the end of the rail until so much of the screw has been cut that the part thus cut shall pass into the nut of the standard and be there held firmly and steady in a horizontal line—said clamp having the necessary depressions in the same to allow it to fit over the V and around the tenon of the bedstead-rail: the clamp is removed and the jaws opened in order to allow the V to continue to perform its operation of cutting the thread close to the shoulder and into it, if necessary, instead of leaving this part of the tenon smooth and blank without any thread—in the old machine the part of the standard between the V and the shoulder of the rail interfering with the operation by coming in contact with said shoulder. The crank H and screw I is for conveying the rail forward and turning it around while it remains in contact with the V, by which operation the thread is cut. Mortises K are made in the bench to allow of the standards being shifted from one to another according to the length of rails required, the bottoms of said standards having tenons extending below the bench on which screws are cut for nuts.

The rails and tenons thereon are turned and the lengths determined by means of a gage fixed on the bench. In gaging, a mark is made on the side of all of them in the same place to indicate where the screw is to be commenced so that in putting the rails and posts together they shall all come up snug and true without the necessity and trouble of cutting and fitting. The part of the machine just described is for cutting the right hand screw. The standards and screws on the other side of the bench are for cutting the left hand screw, the rail being shifted from the one to the other. The same clamp and socket will answer for both.

The nuts in the posts are cut by means of a mandrel on which a thread is formed and a clamp for holding the posts as represented at Figure 4.

When the gage marks on the rails are coincident with a mark on the standard, then the shoulders of all the rails must be at the same position from the jaws, which distance is determined by a block or gage.

The invention claimed and desired to be secured by Letters Patent consists in—

The arrangement and adaptation of the jaws in combination with the clamp for the purpose above set forth.

JACOB LINDLY.

Witnesses:
 WM. P. ELLIOT,
 WM. BISHOP.